United States Patent [19]

Strachan

[11] Patent Number: 5,120,380
[45] Date of Patent: Jun. 9, 1992

[54] METHOD AND APPARATUS FOR FORMING IN-LINE CORE-FILLED PULTRUDED PROFILES

[75] Inventor: Robert Strachan, Aberdeen, Scotland
[73] Assignee: Caledonia Composites Limited, Aberdeen, Scotland
[21] Appl. No.: 424,229
[22] PCT Filed: Apr. 21, 1988
[86] PCT No.: PCT/GB88/00305
  § 371 Date: Oct. 17, 1989
  § 102(e) Date: Oct. 17, 1989
[87] PCT Pub. No.: WO88/08367
  PCT Pub. Date: Nov. 3, 1988
[30] Foreign Application Priority Data
  Apr. 22, 1987 [GB] United Kingdom ............... 8709455
[51] Int. Cl.⁵ ............................................. B29C 67/14
[52] U.S. Cl. ................................. 156/164; 156/180; 156/441; 264/137; 264/510; 264/518; 425/83.1; 425/114
[58] Field of Search .......... 425/114, 115, 80.1, 425/83.1; 264/134, 135, 136, 137, 510, 518; 156/161, 180, 182, 163, 164, 441, 552

[56] References Cited

U.S. PATENT DOCUMENTS

| | | | |
|---|---|---|---|
| 3,229,005 | 1/1966 | Reifanhäuser | 264/46.1 |
| 3,406,231 | 10/1968 | Ullman et al. | 264/137 |
| 3,726,755 | 4/1973 | Shannon | 428/338 |
| 3,882,211 | 5/1975 | Kamp | 264/518 |
| 3,904,336 | 9/1975 | Axer et al. | 425/115 |
| 4,115,498 | 9/1978 | Kissell et al. | 264/137 |
| 4,166,090 | 8/1979 | Green et al. | 264/518 |
| 4,891,179 | 1/1990 | Peacock et al. | 264/258 |

FOREIGN PATENT DOCUMENTS

| | | |
|---|---|---|
| 0158118 | 10/1985 | European Pat. Off. |
| 3545089 | 6/1986 | Fed. Rep. of Germany |
| 58-33425 | 2/1983 | Japan |
| WO85/05071 | 11/1985 | PCT Int'l Appl. |
| 1338536 | 11/1973 | United Kingdom |
| 2143768 | 2/1985 | United Kingdom |

Primary Examiner—Jay H. Woo
Assistant Examiner—Robert B. Davis
Attorney, Agent, or Firm—Bell, Seltzer, Park & Gibson

[57] ABSTRACT

In the manufacture of an in-line cored pultruded profile, filler is bonded with polyester or methacrylate type resin and enclosed in fiberglass, carbon or aramid fiber cloth. The cloth is preformed to replicate the desired profile shape by means of a pre-die former and the external surface of a hollow duct. Filler is delivered into the interior of the duct by a variable output venturi blower. Precise distribution of packing is effected by the internal configuration of the duct and the creation of a raised moving wall when non-foaming resin is used. Precise configuration of ducts can be achieved by fashioning from reinforced cloth. Adjustable start drums provide time and labor saving benefits. Complete resin wet through using either foaming or non-foaming resin ensures exellent filler bonding and surface finish.

12 Claims, 2 Drawing Sheets

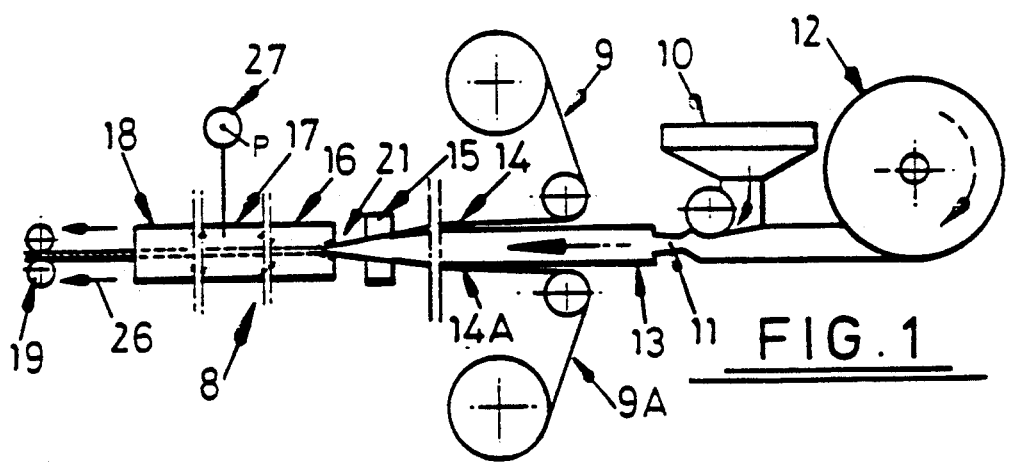
FIG. 1
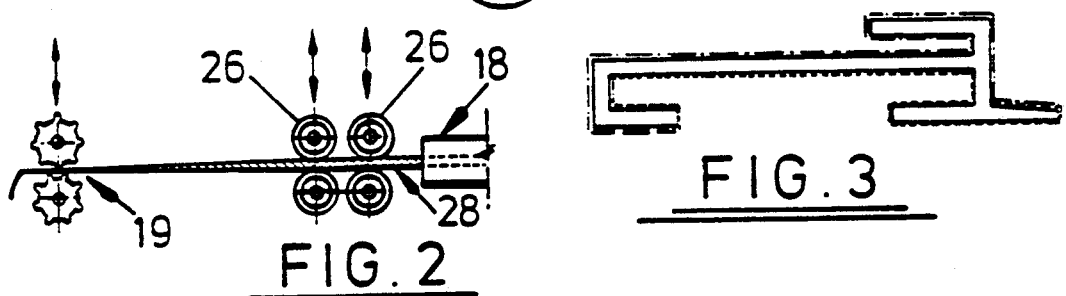
FIG. 2
FIG. 3
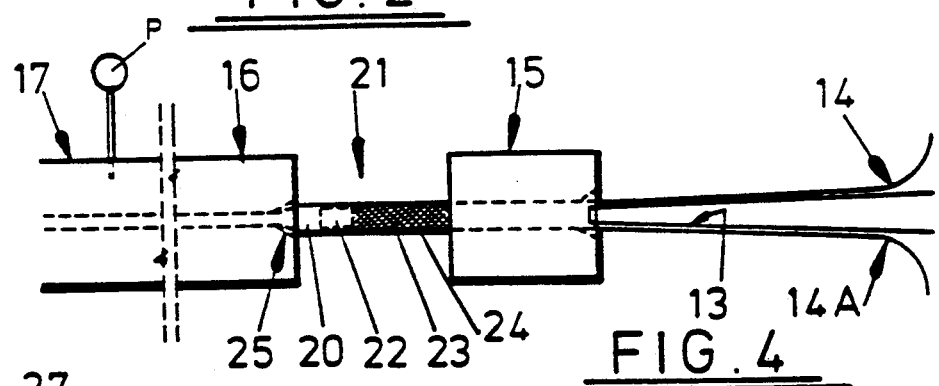
FIG. 4
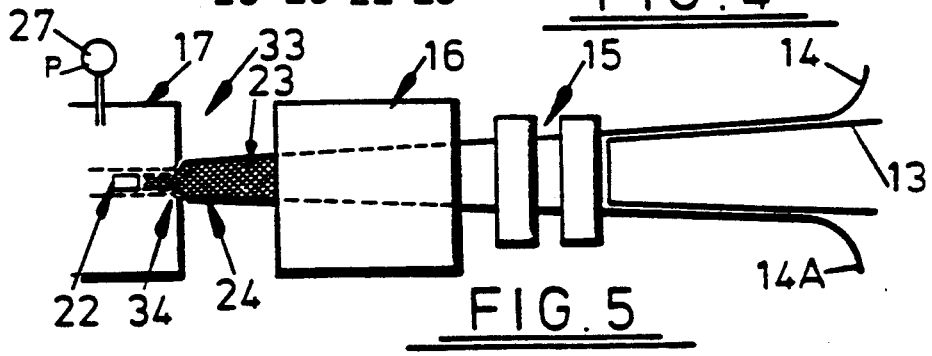
FIG. 5

METHOD AND APPARATUS FOR FORMING IN-LINE CORE-FILLED PULTRUDED PROFILES

This invention relates to in-line core-filled pultruded profiles.

It is well known that pultrusion is an effective method of producing constant cross-section profiles by a continuous process. Known profiles are mostly made of resin-bonded glass fiber rovings but where additional strength is required some or all of the glass fiber rovings may be replaced with carbon or aramid fiber rovings. Typically the rovings are unwound from cones (or cheeses) mounted on a frame and individually fed via guides to the inlet of a die station so that the rovings occupy the cross-sectional area of the die. Bonding resin is injected into the die to wet the rovings which are then transported through a curing die where the resin cures to provide a rigid resin bonded profile. Most profiles have standard cross-sectional shapes such as L, U, T, O. Hollow section profiles have also been manufactured and cored in a secondary process by injection of polyurethane or polyisocyanurate type foams. Precise core packing in complex pultruded profiles is difficult to achieve, and shrinkage in the core foam when processed creates bonding difficulties, resulting in a high percentage of rejects. More recently there has been proposed in U.K. patent specification No. 2160143A a method of manufacturing in-line core-filled pultruded profiles in which the rovings which form a skin in the profile are fed to the die station at the same time as but separately from particulate filler, the latter being a combination of coarse and fine granulates delivered to the die station by vacuum applied at the die station.

It is an object to provide a new and improved system of manufacturing pultruded profiles and new and improved pultruded profiles.

According to the present invention there is provided a system of manufacturing pultruded profiles having a core resin-bonded to a skin, comprising separately feeding core-forming materials and skin-forming materials to the inlet of a pultrusion die station which includes a resin-curing die having a cross-sectional shape for determining the cross-sectional shape of the profile, the core-forming materials being delivered to the die station inlet through a hollow duct and the skin-forming materials being delivered exteriorly of the duct to the die station inlet, introducing bonding resin to said station, and pulling from the outlet of said station an in-line cored resin-bonded profile, characterized in that the hollow duct is elongate and is provided with an external shape which progressively along its length conforms to the cross-sectional shape of the resin-curing die and at the die station end is similar in cross-section but oversize in relation to that of the resin-curing die, the skin-forming materials comprising at least one run of cloth which is guided over the outer surface of the duct so as progressively to conform to the cross-sectional shape of the resin-curing die as the cloth run approaches the die station.

Further according to the present invention there is provided a pultruded profile having a core resin-bonded to a skin, the skin comprising resin-impregnated cloth.

By virtue of the present invention because the skin-forming materials comprise at least one run of cloth, fiber rovings are reduced or eliminated with consequential reduction or elimination of the very substantial labour and time required to monitor and handle cones (or cheeses) which, even for simple profiles are extensive in number. The use of cloth when woven also imparts a two-dimensional strength to the profile in comparison to the one dimensional strength imparted by rovings. The use of cloth is rendered practical by the presence of the externally profiled former duct in advance of the die station.

Preferably the core-forming materials comprise particulate matter blown through the duct towards the die station by an air stream which is at least partly diffused outwardly through the cloth prior to the resin-curing die. This arrangement contributes to good packing of the particulate matter in the profile.

Preferably also the air stream is provided by a venturi blower so as to distribute the particulate matter across the cross-sectional shape of the profile. The particulate matter may be of uniform grain size because of the even distribution and good packing arrangements provided. Also, the inner surface of the duct preferably conforms progressively along its length to the cross-sectional shape of the die and at the die station end is similar in cross-section to that of the die so that the core-forming materials progressively conform to the cross-sectional shape of the resin-curing die as they approach the die station.

A pre-die former may be provided prior to the die station in advance of and spaced from the resin-curing die, the pre-die former having a cross-sectional shape which is similar to but oversize in relation to the curing die. The pre-die former may be tapered along its length being of greater cross-section at its input end than at its output end. With these arrangements the core-forming materials emergent from the pre-die former form a slightly enlarged moving wall encased in the cloth which further contributes to precise packing of the particulate matter in the profile, prior to moving towards the curing die and the core-forming materials emergent from the curing die are thus in compacted form.

The resin may be delivered to an injection die in the die station in advance of the curing die and is arranged to penetrate the skin forming materials and the core forming materials to provide complete wet through prior to the profile entering the curing die. Alternatively the resin may be of the foaming type delivered to the die station as core-forming material and arranged to penetrate the skin forming materials to provide complete wet through prior to the profile entering the curing die.

The core-forming materials may be foaming type resin or dry particulate matter or a combination of thereof.

The cloth may be woven or non-woven and made of fibrous materials such as glass fiber, carbon fiber or aramid fiber.

BRIEF DESCRIPTION OF THE DRAWINGS

Embodiments of the present invention will now be described by way of example with reference to the accompanying drawings in which:

FIG. 1 is a schematic illustration of a system of manufacturing pultruded profiles in accordance with the present invention;

FIG. 2 is an enlarged view of a detail in FIG. 1;

FIG. 3 illustrates the cross-sectional shape of the profile produced by the FIG. 1 system;

FIG. 4 is an enlarged view of another detail in FIG. 1;

FIG. 5 illustrates a modified form of the FIG. 4 detail;

Figure 6:
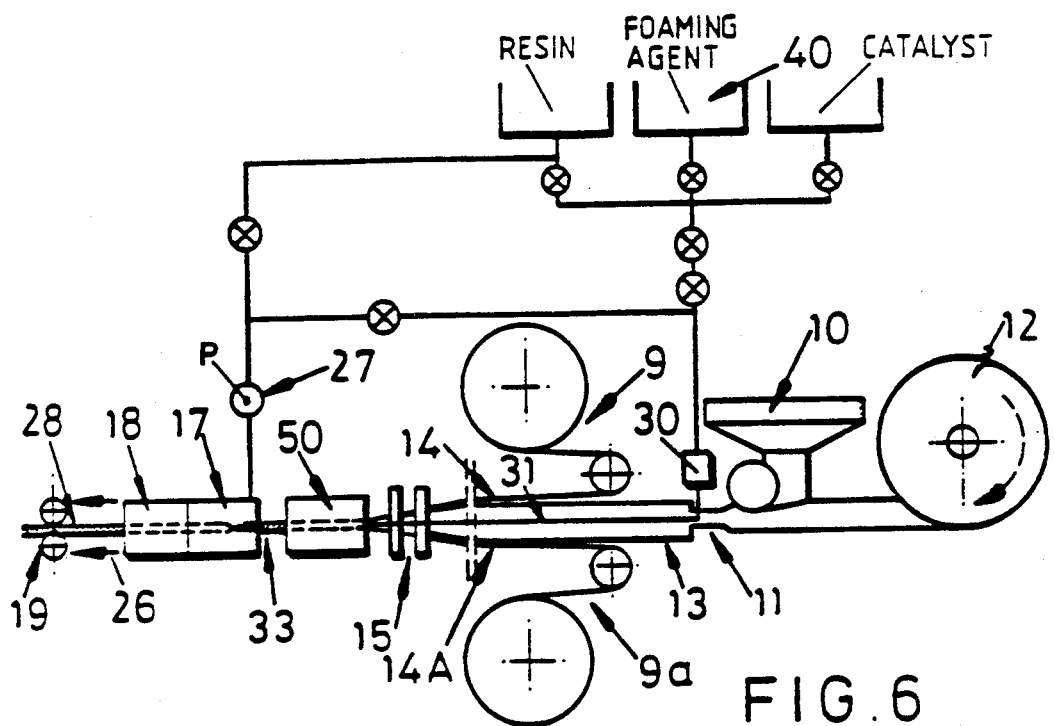
FIG. 6 is a schematic illustration of another system of manufacturing profiles in accordance with the present invention.

In the system of manufacturing pultruded profiles which is shown in FIG. 1 cloth, preferably woven fiberglass 14,14A, is delivered by supply rolls 9, 9A, and guided over the external profiled surface of a former duct 13 to a pre-die former 15, through the dies 16, 17, 18, of a die station 8 to cloth pulling rolls 19. The duct 13 is hollow and at its end 11 remote from the former 15 there is delivered particulate core filling material, from a hopper 10, borne on an air stream provided by a Venturi blower 12. The air stream blows towards the die station 8 and is at least partly diffused through the cloth 14, 14A, prior to the resin-curing die 18 and forms a body of core filling material filling the space between the runs of cloth 14, 14A, in the gap 21 between the pre-die former 15 and the leading die section 16 of station 8, as is shown in FIG. 4. The cloth runs 14, 14A, when secured to the start rolls 19 are fashioned to occupy the contours of the dies in station 8 and are held in this configuration through the pre-die former 15 and over part of the exterior surface of the duct 13 which is elongate and is provided with an external shape which progressively along its length conforms to the cross sectional shape of the resin curing die 18 and at the die station end of the duct 13 is similar in cross section but oversize in relation to that of the resin curing die 18. The cloth 14, 14A, is held under slight longitudinal tension by a combination of the effect of supply rolls 9, 9A, and rolls 19. When the start or take up rolls 19 are set in motion and cloth 14, 14A, is pulled, the cloth with its core forming materials (initially held in place by a shaped plug 22 fitted into the space 20 between the cloth runs 14, 14A in gap 21) progresses through the die station 8 which is supplied with resin fed to injection die 17 via a pump 27. The emergent profile 28 which is resin cured is collected by retractable pullers 26 which progress the profile and permit the cloth rolls 19 to be separated since they no longer function when the cloth 14, 14A, has been resin bonded. Curing die 18 is programmed to function at the appropriate temperature for curing the resin.

The shape of the former duct 13 is determined in advance of profile manufacture by feeding the cloth runs 14, 14A, from the supply rolls 9, 9A, through the die station 8 to the start rolls 19, in the absence of core forming materials. The cloth is positioned and arranged to occupy the perimeter of the die shape which by way of example may be as illustrated in FIG. 3. Supply rolls 9, 9A, are then tensioned so that the cloth runs 14, 14A, are absolutely taught and taking up their natural configuration between the rolls 9, 9A, and the die station 8. The cloth 14, 14A, in the space between forming die section 16 and supply rolls 9, 9A, is externally sprayed with successive coats of resin which is cured to provide a rigid pattern unit which is cut from the runs of cloth and internally strengthened where necessary by application of additional fiberglass cloth and resin to produce a mould. The mould then serves for production of former ducts 13 made from any suitable material such as glass reinforced plastic, timber, steel or aluminium which may be cast or fabricated. The feed end 11 of the duct 13 is fashioned or shaped precisely to fit the output of the venturi blower 12 and the delivery end of the duct 13 is located in the proximity of the pre-die former 15 as shown in FIG. 4. The pre-die former 15 and the forming die section 16 have the same cross sectional shape as the curing die 18 but are oversize in relation to die 18. They may also be tapered along their length (as is schematically shown for the pre-die former 15 in FIG. 1) being of greater cross section at their input ends than at their output ends. With this arrangement during production of pultruded profiles the cloth runs 14, 14A, are guided over the outer surface of the duct 13 so as progressively to conform to the cross sectional shape of the die 18 as the cloth runs approach the die station 8. This guiding action may be aided with transverse members (not shown) overlying the cloth runs 14, 14A.

The pre-die former 15 which at its outlet end is of dimension slightly in excess of the curing die 18 is located in proximity to but spaced from the bell mouth 25 entry of the leading or forming die section 16, the precise spacing 21 being determined to permit the cloth 14, 14A, to form completely and move without distorting with core material in the gap or space 21 in the form of a slightly raised moving wall 24 which completely occupies the hollow profile shape and is encased between the two runs of cloth 14, 14A which overlap along their longitudinal edges thus preventing discharge of filler material.

The interior surface of the duct 13 may also conform progressively along its length to the cross-sectional shape of the die 18 and at the die station end is similar in cross-section to that of the die 18 so that the core-forming materials progressively conform to the cross-sectional shape of the die 18 as they approach the die station.

In order to prevent blowback of any filler material of granular form caused by venturi turbulence excess air is diffused through the cloth 14, 14A, in advance of curing station 18. This may occur in the gap 21 but preferably is aided by apertures in the forming duct 13. The gap 21 may vary in size from about 50 mm to 200 mm dependent on the profile shape and allows a slightly raised wall 24 of core filling material to be offered to the bell mouth 25 of the leading or forming die section 16. Gap 21 allows visual inspection of the profile during manufacture to ascertain packing quality and to determine whether any adjustments are necessary to the filler flow rate to maintain the slightly raised moving wall 24 at a constant level. This raised wall 24 serves the role of ensuring precise filler packing and closure of the leading die section 16 which functions as a closure for the pressure vessel incorporated in the injection die 17 so that the injection die 17 enables adequate resin wet through of the cloth 14, 14A, and the filler material to provide resin bonding throughout the cross sectional shape of the profile.

In the modified arrangement shown in FIG. 5 the leading or forming die section 16 is spaced from the injection die 17 to provide a gap 33 in which the raised moving wall 24 is formed. The forming die section 16 is tapered along its length to aid in the process of packing the filler material and the pre-die former 15 is in the form of two separated sections which are spaced from the forming die section 16. The provision of gap 33 and wall 24 formed therein permits inspection of the effect of the forming die section 16 and allows a check to be made that the wall 24 completely fills the bell mouth 34 of the injection die 17, thus completing the pressure vessel effect.

The curing die 18 has a centrally heated section flanked by laterally disposed cooling sections of which the cooling section adjacent the injection die 17 functions to isolate heat from the heated section travelling into the injection die 17 and causing premature curing of the resin therein.

Dependent on the end use of the pultruded profile 28, a large selection of suitable filler materials can be used. Typical of such materials are silicate hollow microspheres, a wide range of layer mineral foams, including vermiculite, china and fire clays, montmotillonite and sepiolite. A preferred filler is available under the trade name PORAVER and is manufactured in Germany. PORAVER is processed from recycled glass which has been selected, cleaned and microfinely ground, then sintered at 1000° C. The resulting filler is a ball shaped granulate which is non combustible, acid and alkali resistant. From a core aspect, additional attractive properties of PORAVER are excellent heat and sound insulation, good water resistance and very low water absorption.

In spite of its light weight the compressive strength of PORAVER of 0.8 to 1.1 $N/mm^2$ is extremely high. Bonded with a suitable resin with or without a foaming agent, PORAVER satisfies the engineering requirement of a core with a high strength to weight ratio. PORAVER being ball shaped and containing no broken granulates is free flowing and entirely suitable in all aspects for packing and is available in a range of grain sizes from 0.5 mm to 20 mm so that a single grain size choice is available to suit complex or simple shaped profiles eliminating the need for a secondary grain size filler.

While all the fillers referred to are granular and have good thermal, acoustic, and fire retardancy properties other fillers such as granular peat, wood chip and sawdust can adequately be used where the aforementioned properties are not important.

The resin may be any suitable form such as polyester or methacrylate and may be formulated to be foaming (by a foaming agent such as Luperfoam 329) or non-foaming and injected into injection die 17 via pump 27 to provide resin wet through of the cloth 14, 14A, from its exterior. Alternatively or additionally resin may be delivered through the duct 13 to the interior of the space between the cloth runs 14, 14A, and with this arrangement the resin may be fed in combination with particulate filler from hopper 10 or when the resin is of a foaming type may itself constitute the core for the profile. The ratio of granular filler to foamed resin can be varied to suit the profile end use. Advantages accruing from a combination of granular filler and foamed resin or foamed resin only as the core medium are that the profile produced is of extremely lightweight due to the reduction of liquid resin content. This also reduces production costs.

Figure 7:
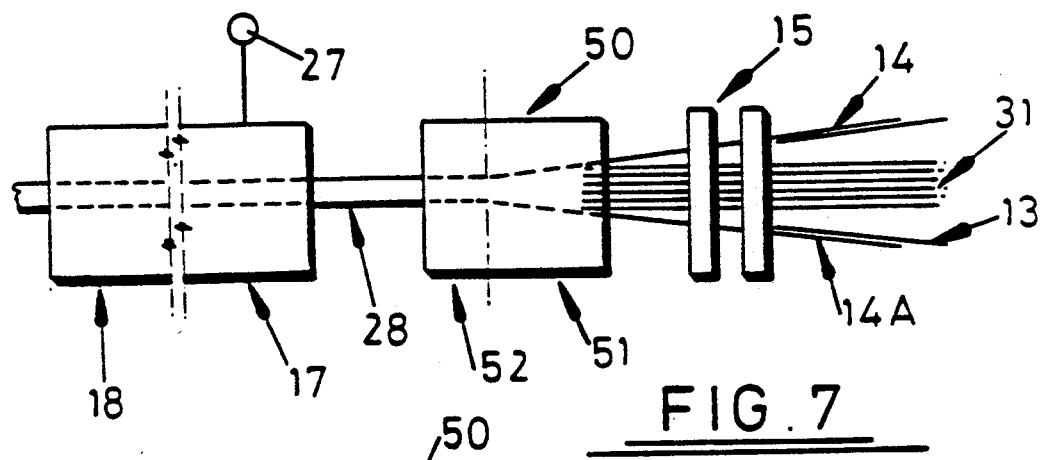
FIG. 7 is an enlarged view of a detail in FIG. 6.
Figure 8:
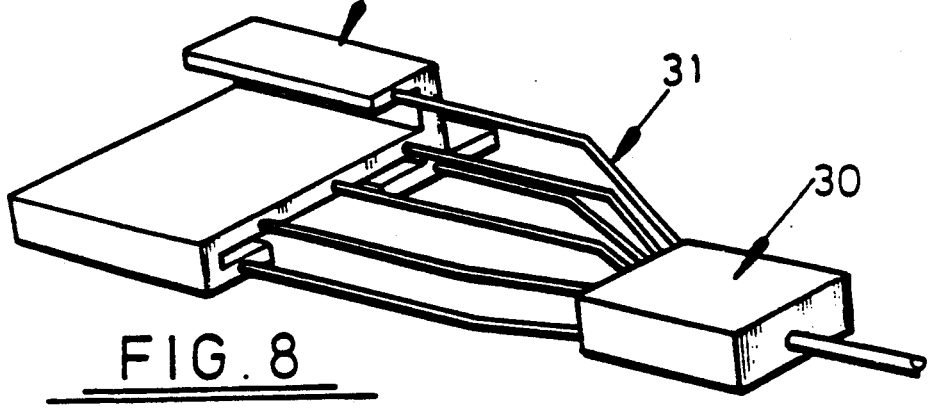
FIG. 8 is an enlarged schematic view of another detail in FIG. 6.

The injection of resin through the duct 13 is preferably effected by the system shown in FIGS. 6 to 8 by distributed pipes 31 extending along the interior of duct 13 into a modified forming die section or die station 50 which is spaced from the injection die 17 and has a tapered bore leading portion 51 and a parallel bore trailing portion 52 as shown in FIG. 7. The pipes 31 are distributed over the cross sectional shape of the die and are fed from a manifold 30 which in turn is fed with the resin components from supply stations 40. Stations 40 are connected via valved and metered pipelines to the manifold 30 and to the pump 27 so that resin can be fed to either or both and in any combination of foaming or non-foaming resin types. The foaming resin components when delivered via manifold 30 are formulated to react so as to exotherm and expand in the tapered entry portion 51 of forming die section 50 and the resin is cured in the parallel trailing portion 52 of the forming die section 50. Pump 27 may feed resin to injection die 17 to impart a surface resin coating which is cured in curing die 18.

In the case where the core forming materials are provided by a foaming resin (utilising a foaming agent such as Luperfoam 329) no particulates are fed from hopper 10 and the blower 12 is inactive as may be the injection die 17 and curing die 18. The core-forming foaming resin is cured in the curing die portion 52 of die section 50 due to elevated temperature. The formulation of the resin is regulated to conform with the elevated temperature and the rate of production of the profile. By way of example if the foaming agent is Luperfoam 329 or the like the curing temperature is of the order of 60° to 70° C. In comparison non-foaming resins commonly have curing temperatures of the order of 120° to 150° C.

It will now be appreciated that in the system of manufacturing in-line core protruded profiles coring occurs as an integrated process and not as a secondary process, the skin of the profile is primarily formed by cloth rather than rovings although for particular profile characteristics such as localised protrusions these may be formed by rovings confined to a relatively small number. The core filling materials may be granular of a single grain size and of an inert nature or may be formed by foaming resinous material. Granular core filling materials are delivered on an air stream issuing from a venturi blower in the absence of vacuum applied at the die station. Resin bonding of the core filling and skin forming materials may be effected either inwardly or outwardly with respect to the core forming materials and may be effected by resinous material of foaming or non-foaming type. The system utilises cloth for skin forming which is carefully guided to the die station over a profiled surface which is itself contoured to conform with the shape of the die but in an oversized and tapering fashion and the die station includes a forming die, preferably also of tapering bore, which may be spaced from the injection die 17 in a manner which enables a raised moving wall of filler to be provided so that good core packing is achieved in advance of the injection die 17 and during pulling of the materials through the injection die 17 and the curing die 18 the core packing materials and the skin forming materials are compacted together by virtue of the reduced dimensions of these dies. The profile 28 may accordingly be of simple or complex shape which is relatively easily manufactured due to the ease of handling cloth both at start up of the process and on replenishment of the supply rolls 9, 9A.

I claim:
1. A method of manufacturing pultruded profiles having a core resin-bonded to a skin, comprising:
    (a) providing a pultrusion die station defining an inlet and an outlet and including a resin-curing die defining a cross-sectional shape for determining the cross-sectional shape of a profile;
    (b) providing an elongate hollow duct which extends towards the die station inlet, has a first end remote from the resin-curing die and a second end closer to the resin-curing die and an external cross-sectional shape which changes progressively from the first end to the second end and at the second end is similar in cross-section, but oversize in relation to the cross-sectional shape of the resin-curing die;

(c) blowing core forming materials to the die station inlet through the duct means by an air stream;

(d) separately feeding skin forming materials, in the form of at least one run of cloth, to the die station inlet;

(e) guiding the cloth over the outer surface of the duct and progressively guiding the cloth to conform to the cross-sectional shape of the resin-curing die as the cloth run approaches the die station;

(f) at least partially diffusing said air stream outwardly through the cloth prior to the die station;

(g) introducing bonding resin to the die station; and (h) pulling an in-line cored resin-bonded profile from the die station outlet;

whereby the pultruded profile has an increased two dimensional strength resulting from the use of cloth as skin forming material.

2. A method as claimed in claim 1 wherein the core-forming materials comprise particulate matter.

3. A method as claimed in claim 2, wherein the particulate matter is of substantially uniform grain size.

4. A method as claimed in claim 3, wherein the core forming materials are progressively conformed to the cross-sectional shape of the resin-curing die as the materials approach the die station through the duct.

5. A method as claimed in claim 1, further comprising providing a pre-die former in advance of and spaced from said resin-curing die, said pre-die former having a cross-sectional shape which is similar to but oversize in relation to the resin-curing die, and blowing the core-forming materials through the pre-die former to emerge from the former in compacted form to form a slightly enlarged wall encased in said cloth moving towards said resin-curing die.

6. Apparatus for manufacturing pultruded profiles having a core resin-bonded to a skin, comprising:

(a) a pultrusion die station defining an inlet and an outlet and including a resin-curing die defining a cross-sectional shape for determining the cross-sectional shape of a profile;

(b) an elongate hollow duct extending towards the die station inlet having a first end remote from the resin curing die and a second end closer to the resin-curing die, and an external shape which changes progressively from the first end to the second end, and at the second end is similar in cross-section but oversize in relation to the cross-sectional shape of the resin-curing die;

(c) first feeding means comprising an air blower for feeding core forming materials to the die station inlet through the duct by an air stream;

(d) second feeding means for separately feeding skin forming materials, in the form of at least one run of cloth to the die station inlet;

(e) guide means for guiding the cloth over the outer surface of the duct and progressively guiding the cloth to conform to the cross-sectional shape of the resin-curing die as the cloth run approaches the die station, the guide means being spaced from the die station inlet;

(f) third feeding station means for introducing bonding resin to the die station; and (g) pulling means for pulling an in-line cored resin-bonded profile from the die station outlet;

whereby said apparatus is adapted to manufacture pultruded profiles having a skin comprising cloth so that the pultruded profiles have improved two-dimensional strength.

7. An apparatus as claimed in claim 6, wherein the inner surface of the duct conforms progressively along its length to the cross-sectional shape of the resin-curing die.

8. An apparatus as claimed in claim 6, wherein the die station comprises a forming die in advance of and spaced from said resin-curing die; said forming die having a cross-sectional shape which is similar to but oversize in relation to the resin-curing die.

9. An apparatus as claimed in claim 8, wherein said forming die is tapered along its length being of greater cross-section at its input end than at its output end.

10. An apparatus as claimed in claim 6 wherein said air blower means comprises a venturi blower to provide an air stream for blowing the core-forming materials, provided in the form of particulate matter across the cross-sectional shape defined by the duct.

11. An apparatus as claimed in claim 6, wherein the guide means includes a pre-die former located around the duct in the proximity of the second end of the duct and having a cross-sectional shape which is similar to but oversize in relation to the resin-curing die.

12. An apparatus as claimed in claim 11, wherein said pre-die former is tapered along its length being of greater cross-section at its input end than at its output end.

* * * * *